(12) United States Patent
Zhang et al.

(10) Patent No.: US 11,526,639 B2
(45) Date of Patent: Dec. 13, 2022

(54) FRACTIONAL-ORDER KIBAM BATTERY MODEL CONSIDERING NONLINEAR CAPACITY CHARACTERISTICS AND PARAMETER IDENTIFICATION METHOD

(71) Applicant: SHANDONG UNIVERSITY, Shandong (CN)

(72) Inventors: Chenghui Zhang, Jinan (CN); Yunlong Shang, Jinan (CN); Qi Zhang, Jinan (CN); Bin Duan, Jinan (CN); Naxin Cui, Jinan (CN); Zhongkai Zhou, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 652 days.

(21) Appl. No.: 16/493,547

(22) PCT Filed: Oct. 19, 2017

(86) PCT No.: PCT/CN2017/106912
§ 371 (c)(1),
(2) Date: Dec. 20, 2019

(87) PCT Pub. No.: WO2018/153116
PCT Pub. Date: Aug. 30, 2018

(65) Prior Publication Data
US 2020/0175212 A1 Jun. 4, 2020

(30) Foreign Application Priority Data
Feb. 21, 2017 (CN) .......................... 201710093350.0

(51) Int. Cl.
*G06F 30/20* (2020.01)
*G01R 31/367* (2019.01)
(Continued)

(52) U.S. Cl.
CPC ........... *G06F 30/20* (2020.01); *G01R 31/367* (2019.01); *H01M 10/4285* (2013.01); *H02J 7/0048* (2020.01); *G06F 2111/10* (2020.01)

(58) Field of Classification Search
CPC ...... G06F 30/20; G01R 31/367; H02J 7/0048; H01M 10/4285
(Continued)

(56) References Cited

U.S. PATENT DOCUMENTS 6,362,598 B2 * 3/2002 Laig-Horstebrock ........................ G01R 31/389 320/132
6,441,586 B1 * 8/2002 Tate, Jr. ............. G01R 31/3648 320/132

(Continued)

FOREIGN PATENT DOCUMENTS

| CN | 103473446 A | 12/2013 |
| CN | 104112036 A | 10/2014 |

(Continued)

OTHER PUBLICATIONS

Sabatier et al. (Fractional models for lithium-ion batteries,2013, European Control Conference (ECC), pp. 3458-3463) (Year: 2013).*

(Continued)

*Primary Examiner* — Iftekhar A Khan
(74) *Attorney, Agent, or Firm* — JCIP Global Inc.

(57) ABSTRACT

A fractional-order KiBaM battery model considering nonlinear capacity characteristics and a parameter identification method includes a temporary capacity portion and an available capacity portion for describing nonlinear capacity characteristics of a battery, wherein the temporary capacity portion represents the power that can be directly obtained during the discharge, indicating the state of charge (SOC) of the battery; the available capacity portion represents the power that cannot be directly obtained, and such two por- (Continued)

tions are connected; when the battery is discharged, the load current i flows out from the temporary capacity portion, and a power passing rate coefficient of such capacity portions is obtained; and the nonlinear capacity effect and recovery effect of the battery are denoted by the height ratio of the temporary capacity and available capacity portions in view of the magnitude of the fractional order of battery capacity characteristics.

10 Claims, 1 Drawing Sheet

(51) Int. Cl.
    *H02J 7/00*     (2006.01)
    *H01M 10/42*     (2006.01)
    *G06F 111/10*     (2020.01)

(58) Field of Classification Search
    USPC .......................................................... 703/2
    See application file for complete search history.

(56) References Cited

U.S. PATENT DOCUMENTS

| | | | | |
|---|---|---|---|---|
| 6,515,454 | B2* | 2/2003 | Schoch | G01R 31/367 320/132 |
| 6,534,954 | B1* | 3/2003 | Plett | G01R 31/367 320/132 |
| 7,009,401 | B2* | 3/2006 | Kinoshita | G01R 31/389 324/426 |
| 7,199,557 | B2* | 4/2007 | Anbuky | G01R 31/392 320/132 |
| 7,446,504 | B2* | 11/2008 | Plett | G01R 31/367 320/132 |
| 7,683,580 | B2* | 3/2010 | Matsushima | H02J 7/005 324/426 |
| 7,957,921 | B2* | 6/2011 | Tang | H01M 10/48 320/132 |
| 7,965,059 | B2* | 6/2011 | Plett | G01R 31/3648 324/426 |
| 7,969,120 | B2* | 6/2011 | Plett | G01R 31/3828 320/135 |
| 8,103,485 | B2* | 1/2012 | Plett | H01M 10/48 703/2 |
| 8,341,449 | B2* | 12/2012 | Daniel | H04Q 9/00 713/340 |
| 8,449,998 | B2* | 5/2013 | Koetting | H01M 10/48 429/61 |
| 8,643,342 | B2* | 2/2014 | Mehta | H02J 7/0071 320/160 |
| 8,718,988 | B2* | 5/2014 | Bohlen | G01R 31/367 703/2 |
| 8,933,673 | B2* | 1/2015 | Sahinoglu | H02J 7/0071 320/157 |
| 9,366,732 | B2* | 6/2016 | Fahimi | G01R 31/392 |
| 10,663,524 | B2* | 5/2020 | Kawai | G01R 31/367 |
| 10,677,848 | B2* | 6/2020 | Chow | G06F 30/367 |
| 2011/0012563 | A1* | 1/2011 | Paryani | H01M 10/0525 320/162 |
| 2011/0031938 | A1* | 2/2011 | Ishikawa | G01R 31/367 180/65.29 |
| 2011/0208453 | A1* | 8/2011 | Ci | G01R 31/367 702/63 |
| 2012/0130660 | A1* | 5/2012 | Neumeyer | G01R 31/392 320/137 |
| 2012/0210325 | A1* | 8/2012 | de Lind van Wijngaarden | H04W 52/0258 718/103 |
| 2012/0316812 | A1* | 12/2012 | Umeki | G01R 31/3842 702/63 |
| 2013/0091083 | A1* | 4/2013 | Frisch | G06N 20/00 706/14 |
| 2013/0166235 | A1* | 6/2013 | Oh | G01R 31/3842 324/426 |
| 2013/0218496 | A1* | 8/2013 | Koch | B60L 58/10 324/426 |
| 2013/0241467 | A1 | 9/2013 | Sahinoglu et al. | |
| 2013/0320989 | A1* | 12/2013 | Inoue | H02J 7/005 324/427 |
| 2015/0323603 | A1* | 11/2015 | Kim | H02J 7/0025 702/58 |
| 2015/0355283 | A1* | 12/2015 | Lee | G01R 31/3648 702/63 |
| 2016/0018469 | A1* | 1/2016 | Ho | G01R 31/367 702/63 |
| 2016/0054390 | A1* | 2/2016 | Lin | B60L 58/10 702/63 |
| 2016/0093927 | A1* | 3/2016 | Marcicki | H01M 10/0525 429/50 |
| 2017/0045587 | A1* | 2/2017 | Kim | G01R 31/387 |
| 2017/0077561 | A1* | 3/2017 | Fukuda | G01B 7/24 |
| 2017/0125853 | A1* | 5/2017 | Song | H01M 10/484 |
| 2018/0017628 | A1* | 1/2018 | Takegami | G01R 31/367 |
| 2018/0074129 | A1* | 3/2018 | Nakao | B60L 58/24 |
| 2018/0143254 | A1* | 5/2018 | Kim | G01R 31/367 |
| 2018/0348307 | A1* | 12/2018 | Chow | G06F 30/367 |
| 2019/0056456 | A1* | 2/2019 | Fukuda | H01M 10/48 |
| 2019/0190091 | A1* | 6/2019 | Kim | H01M 10/482 |
| 2019/0227125 | A1* | 7/2019 | Fukuda | H01M 10/425 |
| 2020/0209316 | A1* | 7/2020 | Zhang | G01R 31/3648 |

FOREIGN PATENT DOCUMENTS

| | | | | |
|---|---|---|---|---|
| CN | 104361405 | A | 2/2015 | |
| CN | 104392080 | A | 3/2015 | |
| CN | 106855612 | A * | 6/2017 | ........... G01R 31/367 |
| CN | 106855612 | A | 6/2017 | |
| CN | 106896327 | A | 6/2017 | |

OTHER PUBLICATIONS

Ma et al. (Fractional Modeling and SOC Estimation of Lithium-ion Battery, 2016, IEEE, pp. 281-287) (Year: 2016).*

Jongerden et al.; "Which battery model to use?;" IET Software; 2009; pp. 445-457; vol. 3, No. 6.

Jan. 18, 2018 Search Report issued in International Patent Application No. PCT/CN2017/106912.

Jan. 18, 2018 Written Opinion of the International Searching Authority issued in International Patent Application Mo. PCT/CN2017/106912.

* cited by examiner

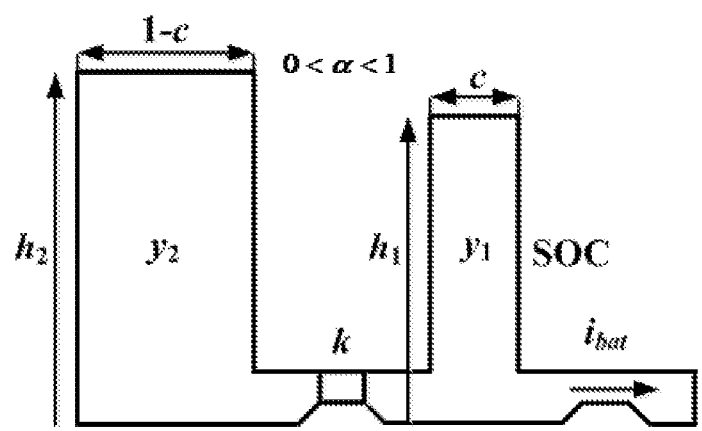

FRACTIONAL-ORDER KIBAM BATTERY MODEL CONSIDERING NONLINEAR CAPACITY CHARACTERISTICS AND PARAMETER IDENTIFICATION METHOD

FIELD OF THE INVENTION

The present invention relates to a fractional-order KiBaM battery model considering nonlinear capacity characteristics and a parameter identification method.

BACKGROUND OF THE INVENTION

As energy crisis and environmental pollution become increasingly serious, electric vehicles have become the most promising automotive industry. At present, power batteries are the major bottleneck restricting the scale development of electric vehicles, and are crucial to overall vehicle performance. Lithium-ion batteries have gradually become the most widely used power batteries for electric vehicles industry due to their advantages of high energy density, long service life, good cost performance, high single-cell voltage, etc.

Battery models are of great significance for the rational design and safe operation of power batteries and battery management systems thereof, and are the basis of battery state of charge (SOC) estimation, state of health (SOH) estimation, remaining useful life (RUL) prediction, etc. However, it is not easy to establish a battery model that is accurate and simple in structure, because its internal chemical reaction is very complicated and has high nonlinearity and uncertainty. The battery models developed to the present stage may be divided, according to different modeling mechanisms, into electrochemical models, simplified electrochemical models, thermal models and the like representing the internal characteristics of batteries, as well as stochastic models, neural network models, equivalent circuit models and the like describing the external characteristics of batteries. Wherein, the electrochemical models describe the internal chemical processes of batteries by using complex nonlinear differential equations, and are accurate but too abstract; the thermal models mainly study the heat generation and transfer processes of batteries; the stochastic models mainly focus on the recovery characteristics of batteries, describe battery behaviors as a Markov process, can describe the pulse discharge characteristics of the batteries, but cannot be applied to variable current situations; the neural network models have the advantages of good nonlinear mapping capability, fast parallel processing capability, stronger self-learning and self-organization capabilities and the like, but require a large amount of tests for acquiring training data, and model errors are susceptible to training data and training methods. In the equivalent circuit models, equivalent circuits are composed of different physical components such as voltage sources, current sources, capacitors and resistors according to the physical characteristics of batteries to simulate the I-V output characteristics of the batteries, and the equivalent circuit models have become the most widely used models as they have advantage that being simple, intuitive and suitable for electrical design and simulation.

However, although the equivalent circuit models can accurately describe the external I-V output characteristics of the batteries, but hardly express the internal characteristics of the batteries such as nonlinear capacity effect and running time. Different from common sense, the available power of a lithium-ion battery is not like the water in a bucket, dropping as how much electricity you use, but with some nonlinear characteristics. Therefore, it is impossible to take out all the power of the battery, and the specific amount of electricity is related to the load and usage of the battery. The nonlinear characteristics are mainly manifested in two aspects: capacity effect and recovery effect. The capacity effect indicates that the higher the discharge current is, the less the electricity obtained is, for example, the total discharge capacity of 1 A current is smaller than that of 0.5 A current. The recovery effect indicates that the power of a battery rises again when the battery is no longer discharged.

The KiBaM (Kinetic Battery Model) electrochemical model skillfully solves this problem. Unlike other models that describe two characteristics of a battery directly using a differential equation or describe the internal physical characteristics of a battery strictly and accurately, the KiBaM electrochemical model is based on the perceptual knowledge, so such KiBaM electrochemical model is intuitive, easy to understand, simple and easy to use, characterizes the nonlinear capacity effect and running time of a battery by using a reduced order equation, and can well describe the discharge characteristics of the battery. The KiBaM electrochemical model considers the recovery effect and capacity effect of the battery, and can accurately represent the internal characteristics of the battery.

In fact, the internal electrochemical reaction process of the battery is extremely complicated, including conductive ion transfer, internal electrochemical reaction, charge and discharge hysteresis effect, concentration diffusion effect, etc., which represents strong nonlinear characteristics and is more suitable for being simulated with a fractional-order model. Compared with an integer-order model, the fractional-order model has more degrees of freedom, greater flexibility and novelty in design. At the same time, by introducing fractional calculus, many new phenomena and laws are added, so that the fractional-order model has the advantages that the conventional integer-order battery models cannot achieve. In fact, fluid motion characteristics, including the motion characteristics of lithium ions, electrons and the like inside the battery, still represent strong fractional calculus characteristics. The results of studying the KiBaM electrochemical model using fractional calculus have not been found yet.

SUMMARY OF THE INVENTION

In order to solve the above problems, the present invention proposes a fractional-order KiBaM battery model considering nonlinear capacity characteristics and a parameter identification method, which consider the recovery effect and specific capacity effect of a battery, can accurately describe the nonlinear capacity effect and running time of the battery, well describe the discharge characteristics of the battery, accurately simulate the internal characteristics of the power battery, have high application value, and solve the shortcomings that the existing battery models hardly represent the internal characteristics of batteries such as nonlinear capacity effect and running time.

The present invention provides a fractional-order KiBaM battery model considering nonlinear capacity characteristics and a parameter identification method, wherein the conventional KiBaM battery model is extended to a fractional order (non-integer order) by using the fractional calculus principle, so that the model obtains more degrees of freedom, greater flexibility and novelty; and the introduction of the fractional order adds many new phenomena and laws at the same time, so that the model has the superiority that the conventional integer-order battery models cannot achieve.

In order to achieve the above objective, the present invention adopts the following technical solution:

A fractional-order KiBaM battery model considering nonlinear capacity characteristics, including a temporary capacity portion and an available capacity portion for describing nonlinear capacity characteristics of a battery, wherein the temporary capacity portion represents the power that can be directly obtained during the discharge, indicating the state of charge (SOC) of the battery; the available capacity portion represents the power that cannot be directly obtained, and such two portions are connected; when the battery is discharged, the load current i flows out from the temporary capacity portion, and a power passing rate coefficient of such capacity portions is obtained at the same time; and the nonlinear capacity effect and recovery effect of the battery are denoted by the height ratio of the temporary capacity and available capacity portions in view of the magnitude of the fractional order of battery capacity characteristics.

The sum of the temporary capacity portion and the available capacity portion is the total capacity of the battery.

When the battery is completely discharged, the height of the temporary capacity portion is zero.

The temporary capacity is denoted by $y_1$ and represents the power that can be directly obtained during the discharge, and its height is denoted by $h_1$ and represents the SOC of the battery; the available capacity is denoted by $y_2$ and represents the power that cannot be directly obtained, and its height is denoted by $h_2$; the sum of $y_1$ and $y_2$ is the total capacity of the battery; c represents a distribution ratio of the battery capacity between such two portions, and the following relationship exists:

$$\begin{cases} h_1(t) = \dfrac{y_1(t)}{c} \\ h_2(t) = \dfrac{y_2(t)}{1-c} \end{cases}.$$

The relationships between the temporary capacity $y_1$ and available capacity $y_2$ and the $h_1$ and $h_2$ representing the SOC of the battery are expressed as:

$$\begin{cases} \dfrac{dy_1^\alpha}{dt^\alpha} = -i(t) + k[h_2(t) - h_1(t)] = -i(t) + k\left[\dfrac{y_2(t)}{1-c} - \dfrac{y_1(t)}{c}\right] \\ \dfrac{dy_2^\alpha}{dt^\alpha} = -k[h_2(t) - h_1(t)] = -k\left[\dfrac{y_2(t)}{1-c} - \dfrac{y_1(t)}{c}\right] \end{cases} \quad (2)$$

In the formula, the temporary capacity is denoted by $y_1$ and represents the power that can be directly obtained during the discharge, and its height is denoted by $h_1$ and represents the SOC of the battery; the available capacity is denoted by $y_2$ and represents the power that cannot be directly obtained, and its height is denoted by $h_2$; the sum of $y_1$ and $y_2$ is the total capacity of the battery; c represents a distribution ratio of the battery capacity between such two portions; k represents a rate coefficient of flow from the temporary capacity to the available capacity; α represents a magnitude of the fractional order of battery capacity characteristics, and $0<\alpha<1$.

Through the established fractional-order KiBaM battery model, the current total remaining capacity y(t), available capacity $C_{avail}(t)$, unavailable capacity $C_{unavail}(t)$, and SOC of the battery are obtained to capture the internal characteristics of running time and nonlinear capacity of the power battery.

The SOC of the power battery is expressed as:

$$SOC(t) = \dfrac{C_{avail}(t)}{C_{init}} = SOC_0 - \dfrac{1}{C_{init}}\left[\int i_{bat}(t)dt + C_{unavail}(t)\right]$$

wherein, the unavailable capacity $C_{unavail}$ of the battery is expressed as:

$$C_{unavail}(t) = (1-c)\delta_h(t) = (1-c)\left(2C - \dfrac{I}{c}\right)t^{\alpha-1}E_{\alpha,\alpha}(-k't^\alpha) \quad (10)$$

the capacity relationship of the power battery is expressed as:

$C_{avail}(t) = C_{init} - \int i_{bat}(t)dt - C_{unavail}(t)$, wherein, c represents a distribution ratio of the battery capacity; k represents a rate coefficient of flow from the temporary capacity to the available capacity; α represents a magnitude of the fractional order of battery capacity characteristics, $0<\alpha<1$, the coefficient $$k' = \dfrac{k}{c(1-c)},$$

and $SOC_0$ is the initial SOC.

An identification method using the above fractional-order KiBaM battery model includes the following steps:

step 1: performing a constant current charge and discharge experiment on a power battery to restore the power battery to a fully charged state as an initial state of the battery;

step 2: performing a low constant current discharge experiment on the power battery to obtain an initial capacity $C_{init}$ of the power battery;

step 3: fully charging the power battery, performing a high constant current discharge experiment, discharging the power battery to a discharge cutoff voltage within a short time as the discharging current is high, then obtaining a capacity $C_1$ of the power battery, and calculating a distribution ratio of the battery capacity;

step 4: performing constant current discharge tests of two groups of different rates on the power battery to obtain unavailable capacity $C_{unavail}$ and discharge time $t_d$ data of the battery under such discharge rate, and calculating an identifiable parameter k' and a magnitude of the order α according to the battery discharge end determination condition; and step 5: obtaining parameters of the fractional-order KiBaM electrochemical model of the tested power battery through the above tests and experiments.

The identification method further includes step 6: performing a constant current discharge test of other rate on the power battery to obtain unavailable capacity and discharge time data of the battery at such discharge rate; and comparing with the unavailable capacity and discharge time calculated by the model to verify the accuracy of the model.

The battery discharge end determination condition is:

$$\begin{cases} y(t) = (C-I)\dfrac{t^{\alpha-1}}{\Gamma(\alpha)} \\ \delta_h(t) = \left(2C - \dfrac{I}{c}\right)t^{\alpha-1}E_{\alpha,\alpha}(-k't^\alpha) \end{cases} \quad (8)$$

Compared with the prior art, the present invention has the beneficial effects:

(1) The present invention relates to a fractional-order KiBaM electrochemical model of a power battery, which is established by considering the recovery effect and specific capacity effect of the battery and comprehensively considering the characteristic factors such as dynamic characteristics and electrochemical mechanisms, accurately captures the nonlinear capacity characteristic and discharge characteristic of the power battery, and can well describe the internal characteristics of the battery such as nonlinear capacity effect and running time;

(2) The power battery represents fractional-order dynamic behaviors due to its special material and chemical properties, the accuracy of a battery described by an integer order is greatly limited, and the essential properties and behaviors of an object with fractional-order properties, when described by fractional calculus, can be better described; the fractional calculus is applied to the KiBaM electrochemical model in the present invention for the first time, with unique insight and innovation;

(3) The fractional calculus has certain memory function, and is more in line with the universal continuous naive philosophical view of nature; because of the unknown parameter of fractional order, the model gains more degrees of freedom, greater flexibility and novelty; therefore, the fractional-order KiBaM electrochemical model of the power battery achieves higher accuracy, better dynamic performance and stability, and provides an accurate and easy-to-implement battery model for SOC estimation.

BRIEF DESCRIPTION OF THE DRAWING

The accompanying drawing constituting a part of the present application is used for providing a further understanding of the present application, and the schematic embodiments of the present application and the descriptions thereof are used for interpreting the present application, rather than constituting improper limitations to the present application.

FIG. 1 is a structural schematic diagram of a fractional-order KiBaM electrochemical model of a power battery according to the present invention.

DETAILED DESCRIPTION OF EMBODIMENTS

The present invention will be further illustrated below in conjunction with the accompanying drawing and embodiments.

It should be pointed out that the following detailed descriptions are all exemplary and aim to further illustrate the present application. Unless otherwise specified, all technical and scientific terms used in the descriptions have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "include" and/or "comprise" are used in the description, they indicate features, steps, operations, devices, components and/or their combination.

FIG. 1 shows a fractional-order KiBaM electrochemical model of a power battery according to the present invention. The fractional-order KiBaM battery model includes two portions, which can be regarded as two containers connected by a channel and having certain volume, for example, wells. Such two portions are used to describe nonlinear capacity characteristics of the battery, respectively called "temporary capacity" and "available capacity"; the "temporary capacity" is denoted by $y_1$ and represents the power that can be directly obtained during the discharge, and its height is denoted by $h_1$ and represents a state of charge (SOC) of the battery; the "available capacity" is denoted by $y_2$ and represents the power that cannot be directly obtained, and its height is denoted by $h_2$; the sum of $y_1$ and $y_2$ is the total capacity of the battery; c represents a distribution ratio of the battery capacity between the two "wells", and the following relationship obviously exists:

$$\begin{cases} h_1(t) = \dfrac{y_1(t)}{c} \\ h_2(t) = \dfrac{y_2(t)}{1-c} \end{cases} \quad (1)$$

In the fractional-order KiBaM battery model, when the battery is discharged, the load current i flows out from a pipe at the lower right corner of $y_1$ representing "temporary capacity", the power of "available capacity" $y_2$ slowly flows into $y_1$ through k at the same time, the speed of outflow is faster than the speed of flow from $y_2$ to $y_1$, $y_1$ drops faster, and the height difference between $y_1$ and $y_2$ increases accordingly; when the battery stops discharging, the power of $y_1$ rises until $y_1$ and $y_2$ have an equal height, which represents the recovery effect of the battery; when the discharge current is higher, the amount of electricity discharged is smaller, which represents the nonlinear capacity effect of the battery;

In the fractional-order KiBaM battery model, the relationships between the "temporary capacity" $y_1$ and "available capacity" $y_2$ and the $h_1$ and $h_2$ representing the SOC of the battery may be expressed as:

$$\begin{cases} \dfrac{dy_1^\alpha}{dt^\alpha} = -i(t) + k[h_2(t) - h_1(t)] = -i(t) + k\left[\dfrac{y_2(t)}{1-c} - \dfrac{y_1(t)}{c}\right] \\ \dfrac{dy_2^\alpha}{dt^\alpha} = -k[h_2(t) - h_1(t)] = -k\left[\dfrac{y_2(t)}{1-c} - \dfrac{y_1(t)}{c}\right] \end{cases} \quad (2)$$

In the formula, the "temporary capacity" is denoted by $y_1$ and represents the power that can be directly obtained during the discharge, and its height is denoted by $h_1$ and represents the SOC of the battery; the "available capacity" is denoted by $y_2$ and represents the power that cannot be directly obtained, and its height is denoted by $h_2$; the sum of $y_1$ and $y_2$ is the total capacity of the battery; c represents a distribution ratio of the battery capacity between the two "wells"; k represents a rate coefficient of flow from the "temporary capacity" to the "available capacity"; a represents a magnitude of the fractional order of battery capacity characteristics, and $0 < \alpha < 1$.

The height difference between the two "wells" is defined as $\delta_h(t)$, obviously:

$$\delta_h(t)=h_2(t)-h_1(t) \quad (3)$$

The unavailable capacity of the battery may be expressed as:

$$C_{unavail}(t)=(1-c)\delta_h(t) \quad (4)$$

It is assumed that the initial capacities $y_{10}$ and $y_{20}$ of the "temporary capacity" $y_1$ and "available capacity" $y_2$ of the battery are respectively:

$$\begin{cases} y_{10} = y_1(t_0) = cC; \\ y_{20} = y_2(t_0) = (1-c)C; \\ y_0 = y_{10} + y_{20} \end{cases} \quad (5)$$

In the formula, C represents the total capacity of the battery. When the battery is discharged by constant current I for the first time, and the discharge time interval is $t_0 \leq t \leq t_d$, if the initial condition is $t_0=0$, that is, the height difference is initially zero, after a period of time $t_d < t < t_r$, formula (2) is subjected to Laplace transformation and inverse Laplace transformation (the transformation process is omitted) to obtain:

$$\begin{cases} y_1(t) = c[y_1(0) + y_2(0) - I]\frac{t^{\alpha-1}}{\Gamma(\alpha)} + [(1-c)(y_1(0)-I) - cy_2(0)]t^{\alpha-1}E_{\alpha,\alpha}(-k't^\alpha) \\ y_2(t) = (1-c)(y_1(0) + y_2(0) - I)\frac{t^{\alpha-1}}{\Gamma(\alpha)} - [(1-c)(y_1(0)-I) - cy_2(0)]t^{\alpha-1}E_{\alpha,\alpha}(-k't^\alpha) \end{cases} \quad (6)$$

In the formula, $\Gamma(\alpha)$ and $E_{\alpha,\alpha}(z)$ are Gamma function and Mittag-Leffler function that are commonly used in fractional calculus calculation; and the coefficient is $$k' = \frac{k}{c(1-c)}.$$

Obtained by arrangement is:

$$\begin{cases} y(t) = [y_1(0) + y_2(0) - I]\frac{t^{\alpha-1}}{\Gamma(\alpha)} \\ \delta_h(t) = \left[\frac{y_1(0)-I}{c} + \frac{y_2(0)}{1-c}\right]t^{\alpha-1}E_{\alpha,\alpha}(-k't^\alpha) \end{cases} \quad (7)$$

By substituting into the initial condition (2), formula (7) can be simplified into:

$$\begin{cases} y(t) = (C-I)\frac{t^{\alpha-1}}{\Gamma(\alpha)} \\ \delta_h(t) = \left(2C - \frac{I}{c}\right)t^{\alpha-1}E_{\alpha,\alpha}(-k't^\alpha) \end{cases} \quad (8)$$

From the previous analysis, when the battery is completely discharged, the height $h_1$ is equal to 0; at this time, the total remaining capacity of the battery is equal to the unavailable capacity:

$$y(t)=C_{unavail}(t)=(1-c)\delta_h(t) \quad (9)$$

The unavailable capacity of the battery $C_{unavail}$ may be expressed as:

$$C_{unavail}(t) = (1-c)\delta_h(t) = (1-c)\left(2C - \frac{I}{c}\right)t^{\alpha-1}E_{\alpha,\alpha}(-k't^\alpha) \quad (10)$$

The capacity relationship of the power battery may be expressed as:

$$C_{avail}(t)=C_{init}-\int i_{bat}(t)dt - C_{unavail}(t) \quad (11)$$

In the formula, $C_{max}$、$C_{avail}$、$_{unavail}$ represent the initial capacity, the available capacity, and the unavailable capacity of the battery, respectively; the unavailable capacity $C_{unavail}$ represents a nonlinear SOC variable affected by the nonlinear capacity characteristic of the battery; Obviously, the SOC of the power battery may be expressed as:

$$SOC(t) = \frac{C_{avail}(t)}{C_{init}}SOC_0 - \frac{1}{C_{init}}\left[\int i_{bat}(t)dt + C_{unavail}(t)\right] \quad (12)$$

The current total remaining capacity y(t), the available capacity $C_{avail}(t)$, the unavailable capacity $C_{unavail}(t)$ and the SOC of the battery may be obtained from the fractional-order KiBaM battery model, so that the internal characteristics of running time and the nonlinear capacity of the power battery can be accurately captured.

An identification method using the above fractional-order KiBaM battery model is provided. From the battery model, the parameters to be identified mainly include an initial capacity $y_0$ of the battery, a distribution ratio c of the battery capacity between the two "wells", a rate coefficient k indicating the flow from the "temporary capacity" to the "available capacity", and a fractional order $\alpha$ of the battery capacity characteristic. The method mainly includes the following steps:

step 1: performing a constant current charge and discharge experiment on a power battery to restore the power battery to a fully charged state as an initial state of the battery;

step 2: performing a low constant current discharge experiment on the power battery to obtain an initial capacity $C_{init}$ of the power battery; step 3: fully charging the power battery, performing a high constant current discharge experiment, discharging the power battery to a discharge cutoff voltage within a short time as the discharging current is high, then obtaining a capacity $C_1$ of the power battery; the parameter c of the battery model is equal to $$\frac{C_1}{C_{init}};$$

step 4: performing constant current discharge tests of two groups of different rates on the power battery to obtain unavailable capacity $C_{unavail}$ and discharge time $t_d$ data of the battery under such discharge rate and the like, and calculating an identifiable parameter k' and an order α according to formula (8)

$$C_{unavail}(t) = (1-c)\delta_h(t_d) = (1-c)\left(2C - \frac{I}{c}\right)t_d^{\alpha-1}E_{\alpha,\alpha}(-k't_d^\alpha)$$

for determining the battery discharge end;

step 5: obtaining parameters of the fractional-order KiBaM electrochemical model of the tested power battery through the above tests and experiments; and step 6: performing a constant current discharge test of other rate on the power battery to obtain unavailable capacity and discharge time data of the battery and the like at that discharge rate; and comparing with the unavailable capacity and discharge time calculated by the model to verify the accuracy of the model.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

Although the specific embodiments of the present invention are described above in combination with the accompanying drawing, the protection scope of the present invention is not limited thereto. It should be understood by those skilled in the art that various modifications or variations could be made by those skilled in the art based on the technical solution of the present invention without any creative effort, and these modifications or variations shall fall into the protection scope of the present invention.

The invention claimed is:

1. A fractional-order KiBaM battery model considering nonlinear capacity characteristics, comprising: a temporary capacity portion and an available capacity portion for describing nonlinear capacity characteristics of a battery, wherein the temporary capacity portion represents the power that can be directly obtained during the discharge, indicating the state of charge (SOC) of the battery; the available capacity portion represents the power that cannot be directly obtained, and such two portions are connected by a channel; when the battery is discharged, the load current i flows out from the temporary capacity portion, and a power passing rate coefficient of such capacity portions is obtained at the same time; and a nonlinear capacity effect and recovery effect of the battery are expressed by using a height ratio of the temporary capacity and available capacity portions combined with a magnitude of a fractional order of battery capacity characteristics, wherein the fractional-order KiBaM battery model is applied to the battery for simulating internal characteristics of the power battery.

2. The fractional-order KiBaM battery model considering nonlinear capacity characteristics according to claim 1, wherein the sum of the temporary capacity portion and the available capacity portion is the total capacity of the battery.

3. The fractional-order KiBaM battery model considering nonlinear capacity characteristics according to claim 1, wherein when the battery is completely discharged, the height of the temporary capacity portion is zero.

4. The fractional-order KiBaM battery model considering nonlinear capacity characteristics according to claim 1, wherein the temporary capacity is denoted by $y_1$ and represents the power that can be directly obtained during the discharge, and its height is denoted by $h_1$ and represents the SOC of the battery; the available capacity is denoted by $y_2$ and represents the power that cannot be directly obtained, and its height is denoted by $h_2$; the sum of $y_1$ and $y_2$ is the total capacity of the battery; c represents a distribution ratio of the battery capacity between such two portions, and the following relationship exists:

$$\begin{cases} h_1(t) = \dfrac{y_1(t)}{c} \\ h_2(t) = \dfrac{y_2(t)}{1-c} \end{cases}.$$

5. The fractional-order KiBaM battery model considering nonlinear capacity characteristics according to claim 1, wherein the relationships between the temporary capacity $y_1$ and available capacity $y_2$ and the $h_1$ and $h_2$ representing the SOC of the battery are expressed as:

$$\begin{cases} \dfrac{dy_1^\alpha}{dt^\alpha} = -i(t) + k[h_2(t) - h_1(t)] = -i(t) + k\left[\dfrac{y_2(t)}{1-c} - \dfrac{y_1(t)}{c}\right] \\ \dfrac{dy_2^\alpha}{dt^\alpha} = -k[h_2(t) - h_1(t)] = -k\left[\dfrac{y_2(t)}{1-c} - \dfrac{y_1(t)}{c}\right] \end{cases} \quad (2)$$

in the formula, the temporary capacity is denoted by $y_1$ and represents the power that can be directly obtained during the discharge, and its height is denoted by $h_1$ and represents the SOC of the battery; the available capacity is denoted by $y_2$ and represents the power that cannot be directly obtained, and its height is denoted by $h_2$; the sum of $y_1$ and $y_2$ is the total capacity of the battery; c represents a distribution ratio of the battery capacity between such two portions; k represents a rate coefficient of flow from the temporary capacity to the available capacity; α represents a magnitude of the fractional order of battery capacity characteristics, and $0<\alpha<1$.

6. The fractional-order KiBaM battery model considering nonlinear capacity characteristics according to claim 1, wherein through the established fractional-order KiBaM battery model, the current total remaining capacity y(t), available capacity $C_{avail}(t)$, unavailable capacity $C_{unavail}(t)$, and SOC of the battery are obtained to capture the internal characteristics of running time and nonlinear capacity of the power battery.

7. The fractional-order KiBaM battery model considering nonlinear capacity characteristics according to claim 1, wherein the SOC of the power battery is expressed as:

$$SOC(t) = \dfrac{C_{avail}(t)}{C_{init}}SOC_0 - \dfrac{1}{C_{init}}\left[\int i_{bat}(t)dt + C_{unavail}(t)\right]$$

wherein the unavailable capacity $C_{unavail}$ of the battery is expressed as:

$$C_{unavail}(t) = (1-c)\delta_h(t) = (1-c)\left(2C - \dfrac{I}{c}\right)t^{\alpha-1}E_{\alpha,\alpha}(-k't^\alpha) \quad (10)$$

the capacity relationship of the power battery is expressed as:

$C_{avail}(t) = C_{init} - \int i_{bat}(t)dt - C_{unavail}(t)$, wherein, c represents a distribution ratio of the battery capacity; C represents a total capacity of the battery; I represents a constant current; $\delta_h(^t)$ represents a height difference between the two "wells"; $E_{\alpha,\alpha}(z)$ is the Mittag-Leffler function; k represents a rate coefficient of flow from the temporary capacity to the available capacity; α represents a magnitude of the fractional order of battery capacity characteristics, 0<α<1, the coefficient $$k' = \frac{k}{c(1-c)},$$

and $SOC_0$ is the initial SOC.

8. A parameter identification method using the fractional-order KiBaM battery model according to claim 1, comprising the following steps:
- step 1: performing a constant current charge and discharge experiment on a power battery to restore the power battery to a fully charged state as an initial state of the battery;
- step 2: performing a low constant current discharge experiment on the power battery to obtain an initial capacity $C_{init}$ of the power battery;
- step 3: fully charging the power battery, performing a high constant current discharge experiment, discharging the power battery to a discharge cutoff voltage within a short time as the discharging current is high, then obtaining a capacity $C_1$ of the power battery, and calculating a distribution ratio of the battery capacity;
- step 4: performing constant current discharge tests of two groups of different rates on the power battery to obtain unavailable capacity $C_{unavail}$ and discharge time $t_d$ data of the battery under such discharge rate, and calculating an identifiable parameter k' and a magnitude of the order α according to the battery discharge end determination condition; and
- step 5: obtaining parameters of the fractional-order KiBaM electrochemical model of the tested power battery through the above tests and experiments.

9. The parameter identification method according to claim 8, further comprising step 6: performing a constant current discharge test of other rate on the power battery to obtain unavailable capacity and discharge time data of the battery at such discharge rate; and comparing with the unavailable capacity and discharge time calculated by the model to verify the accuracy of the model.

10. The parameter identification method according to claim 8, wherein the battery discharge end determination condition is:

$$\begin{cases} y(t) = (C-I)\frac{t^{\alpha-1}}{\Gamma(\alpha)} \\ \delta_h(t) = \left(2C - \frac{I}{c}\right)t^{\alpha-1}E_{\alpha,\alpha}(-k't^{\alpha}) \end{cases} \quad (8)$$

wherein, $\delta_h(^t)$ represents the height difference between the two "wells";

C represents the total capacity of the battery; c represents the distribution ratio of the battery capacity; I represents the constant current; $\Gamma(\alpha)$ and $E_{\alpha,\alpha}(z)$ are the Gamma function and Mittag-Leffler function respectively; α represents a magnitude of the fractional order of battery capacity characteristics, 0<α<1, the coefficient $$k' = \frac{k}{c(1-c)},$$

wherein k represents the rate coefficient of flow from the temporary capacity to the available capacity.

* * * * *